(12) United States Patent
Sich et al.

(10) Patent No.: US 9,327,701 B2
(45) Date of Patent: May 3, 2016

(54) RAILROAD CONTROL VALVE

(75) Inventors: Gary M. Sich, Irwin, PA (US); Jeffrey B. Skweres, McKeesport, PA (US); Michael S. Plechey, Jeannette, PA (US); David J. Meyer, Pittsburgh, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 240 days.

(21) Appl. No.: 13/820,165

(22) PCT Filed: Sep. 26, 2011

(86) PCT No.: PCT/US2011/053247
§ 371 (c)(1),
(2), (4) Date: May 20, 2013

(87) PCT Pub. No.: WO2012/040701
PCT Pub. Date: Mar. 29, 2012

(65) Prior Publication Data
US 2013/0248031 A1   Sep. 26, 2013

Related U.S. Application Data

(60) Provisional application No. 61/386,119, filed on Sep. 24, 2010.

(51) Int. Cl.
*B60T 15/02*   (2006.01)

(52) U.S. Cl.
CPC ........ *B60T 15/021* (2013.01); *Y10T 137/86485* (2015.04)

(58) Field of Classification Search
CPC ....... B60T 15/021; B60T 15/00; B60T 15/02; Y10T 137/86485
USPC ............................................. 137/624.27, 613
See application file for complete search history.

(56) References Cited

U.S. PATENT DOCUMENTS

| | | |
|---|---|---|
| 2,829,010 A | 4/1958 | McClure |
| 4,106,819 A | 8/1978 | Hart |
| RE31,059 E | 10/1982 | Hart |
| 5,503,467 A * | 4/1996 | Gaughan ........................ 303/3 |
| 6,142,062 A | 11/2000 | Streitman |
| 6,318,812 B1 | 11/2001 | Newton et al. |
| 7,980,637 B2 * | 7/2011 | Thomas ......................... 303/70 |
| 2009/0218880 A1 | 9/2009 | Thomas |

\* cited by examiner

*Primary Examiner* — Kevin Lee
(74) *Attorney, Agent, or Firm* — The Webb Law Firm

(57) ABSTRACT

A service portion of a rail control valve includes a body defining a piston passageway, an inshot valve passageway, and a service accelerated release valve passageway. An inshot valve is received by the inshot valve passageway of the body and a service accelerated release valve is received by the service accelerated release valve passageway.

20 Claims, 25 Drawing Sheets

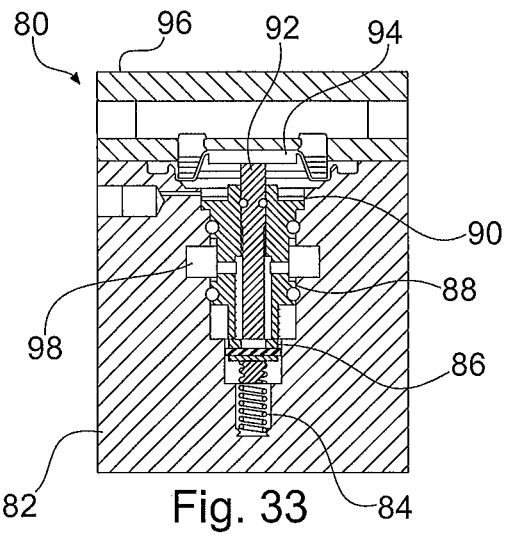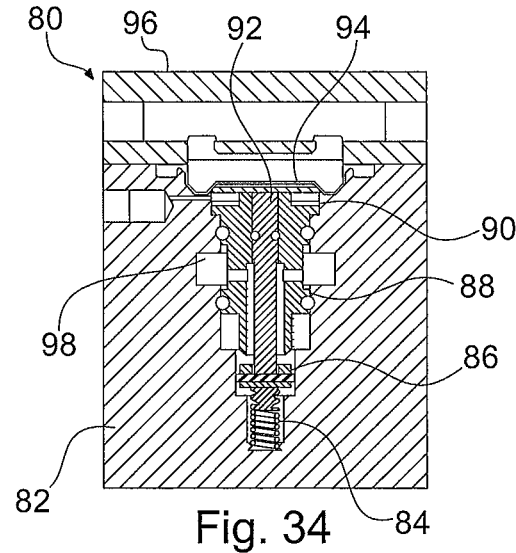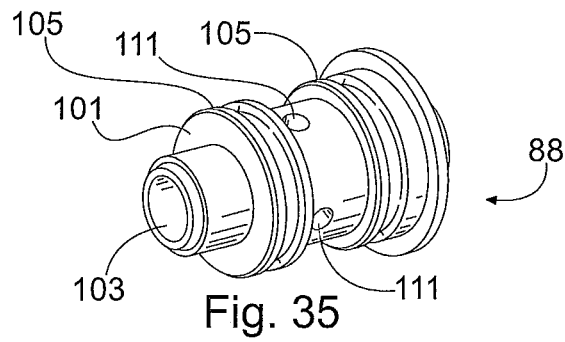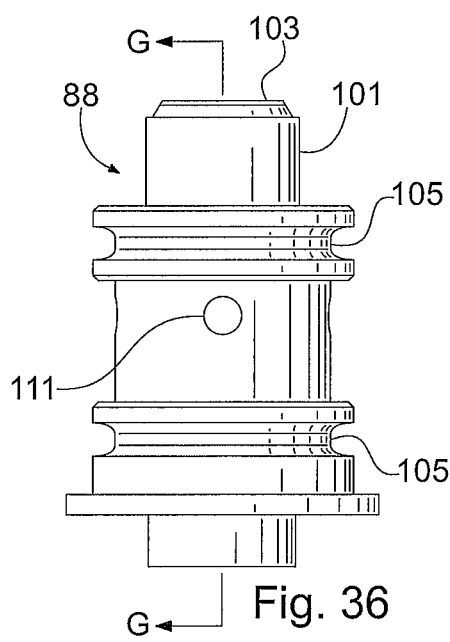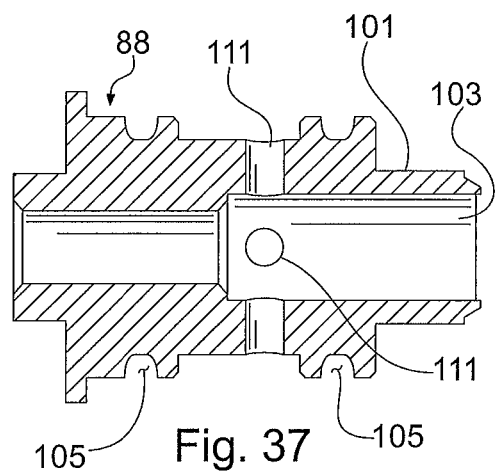

RAILROAD CONTROL VALVE

CROSS REFERENCE TO RELATED APPLICATIONS

This application claims the benefit of U.S. Provisional Application No. 61/386,119, filed Sep. 24, 2010, the entire content of which is hereby incorporated by reference.

BACKGROUND OF THE INVENTION

1. Field of the Invention

The present invention generally relates to brake apparatus for railway vehicles and, more particular, to a service portion of a brake control valve.

2. Description of Related Art

China Railways have a standardized pneumatic air brake valve, called "Type 120", which is similar in overall operation to American Association of Railroads (AAR) pneumatic air brake valves (such as the WABCO ABD), with a pipe bracket, service portion, and emergency valve. The main operating difference between the Type 120 and the ABD and related AAR valves is that the emergency portion provides only vent valve functions, and still relies on the service portion to move air from the reservoir to the brake cylinder. Further, there is no difference in brake cylinder equalization pressure between full service and emergency modes. The pipe bracket also differs from a mechanical viewpoint, with different mounting dimensions.

The Type 120 braking systems utilized in China are generally pneumatic. However, Electronically Controlled Pneumatics (ECP) braking systems are becoming more widely used, and offer many advantages over pneumatic equipment. Having the ability to apply ECP equipment to railcars is generally desirable to take advantage of the superior braking and safety capabilities offered by ECP equipment. The ECP brake equipment on each rail vehicle typically includes a Car ID (CID) which interfaces to the ECP trainline, Car Control Unit (CCD), and ECP Manifold. The ECP Manifold contains the pressure transducers, various pneumatic and electro-pneumatic valves, etc. This equipment is used to monitor the pressures in the brake pipe, the brake cylinder(s), and specific reservoirs, and convert the electrical brake commands into a form usable by the microprocessor. Operating according to its programming code and to the dictates of the brake commands and other electrical signals it has received, the microprocessor controls the electro-pneumatic valves in a manner well-known in the brake control art.

The ECP Manifold also includes at least one microprocessor with a serial data and power interface to the CCD. However, the ECP Manifold functions can also be performed without a microprocessor, based upon direct interface from the CCD to each of the electro-pneumatic solenoid valves and pressure transducers. Further, ECP equipment allows the railcar to be operated in the strictly pneumatic mode if desired, or in the event of a loss of power to the ECP equipment.

SUMMARY OF THE INVENTION

In one embodiment, a service portion of a rail control valve includes a body defining a piston passageway, an inshot valve passageway, and a service accelerated release valve passageway. An inshot valve is received by the inshot valve passageway of the body and a service accelerated release valve is received by the service accelerated release valve passageway.

The service accelerated release valve may include a bushing having a body, a plunger received in a central passageway of the body of the bushing, a diaphragm operatively connected to the plunger, a check valve, and a spring engaged with the check valve. The plunger is movable within the central passageway of the bushing and configured to displace the diaphragm and check valve with the service accelerated release valve having an open position and a closed position. The diaphragm of the service accelerated release valve may comprise a thin section rubber diaphragm having internal fabric and a brass insert. The body of the bushing of the service accelerated release valve may define a pair of spaced apart seats for receiving a pair of o-rings. A retaining ring may secure the bushing of the service accelerated release valve within the body.

The inshot valve may include a bushing having a body, a pushrod received in a central passageway of the body of the bushing, a diaphragm operatively connected to the pushrod, a check valve positioned at a first end of the bushing of the inshot valve, and a follower positioned at a second end of the bushing of the inshot valve. The pushrod is movable within the central passageway of the bushing and is configured to displace the diaphragm, check valve, and follower, with the inshot valve having an open position and a closed position. The inshot valve may further include a valve spring engaged with the check valve, and a follower spring engaged with the follower. The body of the bushing of the inshot valve may define a pair of spaced apart seats for receiving a pair of o-rings. The diaphragm of the inshot valve may comprise a thin section rubber diaphragm having internal fabric and a brass insert. A retaining ring may secure the bushing of the inshot valve within the body.

The service portion may further include a back-flow check valve received within a back-flow check valve passageway defined by the body of the service portion. The back-flow check valve may include a bushing, a check valve configured to engage the bushing, and a spring engaging the check valve, with the back-flow check valve having an open position and a closed position. The body may include ECP porting configured to receive an ECP coin plate.

In a further embodiment, a service portion of a rail control valve includes a body defining a piston passageway, an inshot valve passageway, and a service accelerated release release valve passageway. The service portion further includes an inshot valve received by the inshot valve passageway of the body. The inshot valve includes an inshot bushing having a body, a pushrod received in a central passageway of the body of the inshot bushing, an inshot diaphragm operatively connected to the pushrod, an inshot check valve positioned at a first end of the inshot bushing, and a follower positioned at a second end of the bushing of the inshot valve. The pushrod is moveable within the central passageway of the inshot bushing and configured to displace the inshot diaphragm, inshot check valve, and follower, with the inshot valve having an open position and a closed position. A service accelerated release valve is received by the service accelerated release valve passageway. The service accelerated release valve includes a service accelerated valve bushing having a body, a plunger received in a central passageway of the body of the service accelerated valve bushing, a service accelerated valve diaphragm operatively connected to the plunger, and a service accelerated valve check valve. The plunger is movable within the central passageway of the service accelerated valve bushing and configured to displace the service accelerated valve diaphragm and service accelerated valve check valve, with the service accelerated release valve having an open position and a closed position.

The service portion may include a grad valve having a first surface and a second surface with the first surface defining a generally rectangular-shaped opening and the second surface defining a generally circular-shaped opening. The service portion may include a main bushing received within the piston passageway of the body of the service portion with the main bushing defining a central passageway. A slide valve may be received by the central passageway of the main bushing with the slide valve including a body having a pair of extensions. The slide valve defines a plurality of passageways to form a porting pattern. A back-flow check valve may be received within a back-flow check valve passageway defined by the body of the service portion. The back-flow check valve may include a back-flow check valve bushing, a check valve member configured to engage the back-flow check valve bushing, and a back-flow check valve spring engaging the check valve member, with the back-flow check valve having an open position and a closed position. The service accelerated release valve and the back-flow check valve may be operatively connected to each other.

BRIEF DESCRIPTION OF THE DRAWINGS

FIG. 33 is a cross-sectional view of the SAR valve shown in FIG. 30 along line F-F in FIG. 31, showing the SAR valve in a closed position;

FIG. 34 is a cross-sectional view of the SAR valve shown in FIG. 30 along line F-F in FIG. 31, showing the SAR valve in an open position;

FIG. 35 is a perspective view of a SAR valve bushing according to one embodiment;

FIG. 36 is a top view of the SAR valve bushing shown in FIG. 35;

FIG. 37 is a cross-sectional view of the SAR valve bushing shown in FIG. 35 along line G-G in FIG. 36;

DESCRIPTION OF THE PREFERRED EMBODIMENTS

Figure 1:
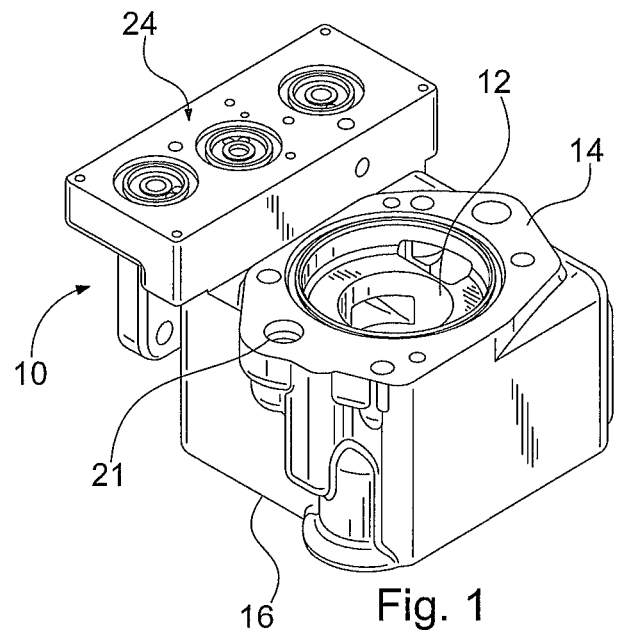
FIG. 1 is a front-top perspective view of a service portion body for a rail control valve according to one embodiment.
Figure 2:
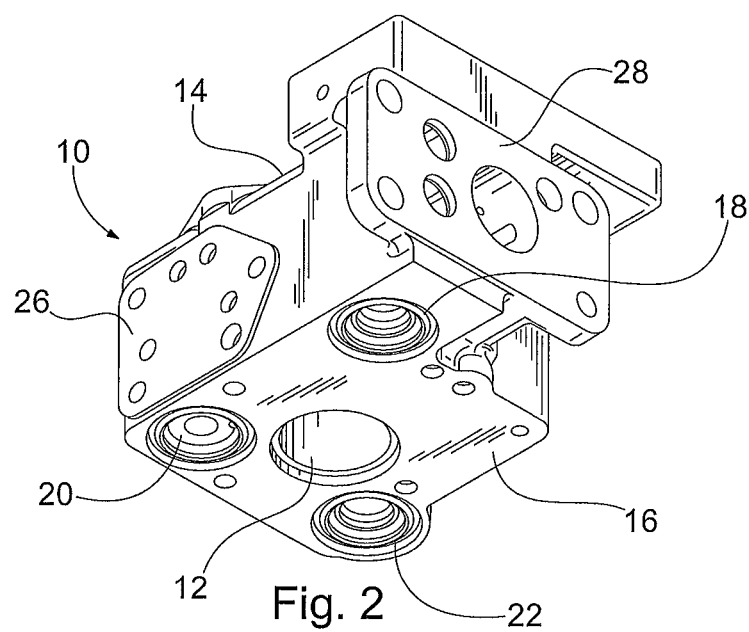
FIG. 2 is a rear-bottom perspective view of the service portion body shown in FIG. 1.
Figure 3:
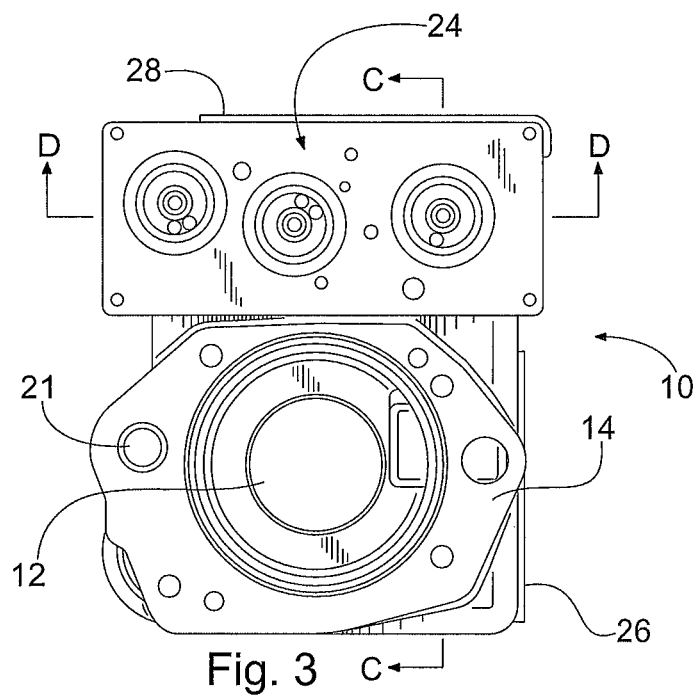
FIG. 3 is a top view of the service portion body shown in FIG. 1.
Figure 4:
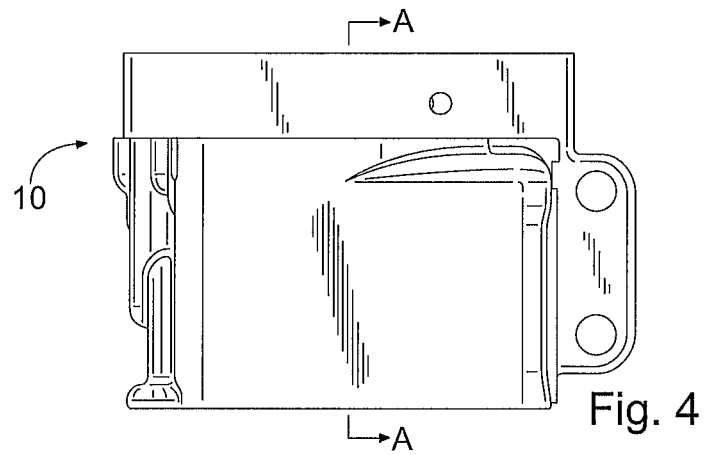
FIG. 4 is a front view of the service portion body shown in FIG. 1.
Figure 5:
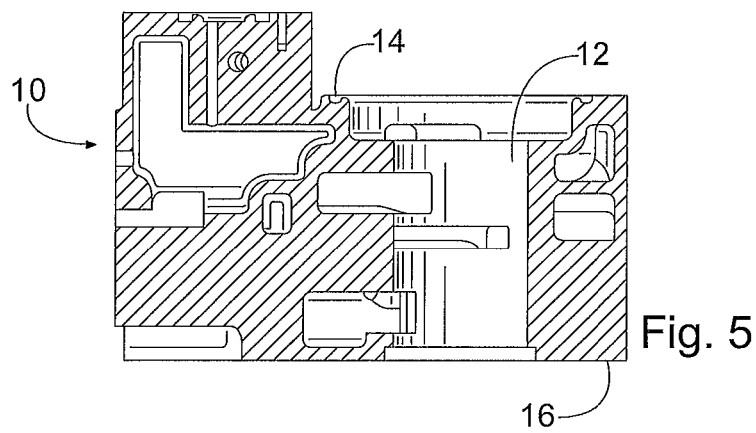
FIG. 5 is a cross-sectional view of the service portion body shown in FIG. 1 along line A-A in FIG. 4.
Figure 6:
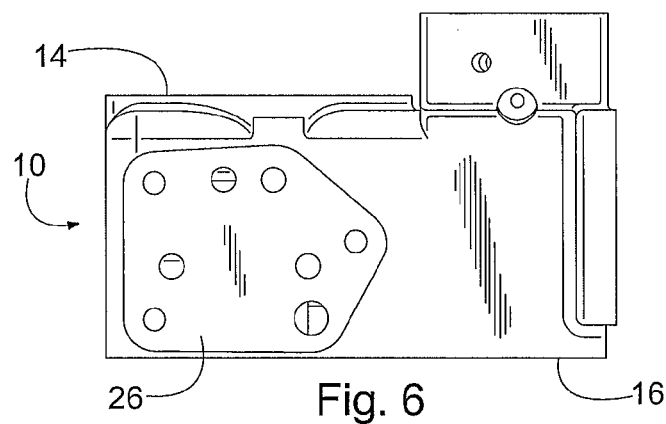
FIG. 6 is a side view of the service portion body shown in FIG. 1.
Figure 7:
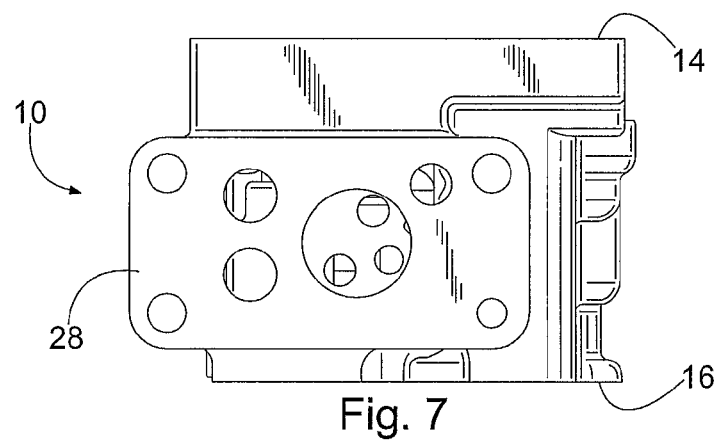
FIG. 7 is a rear view of the service portion body shown in FIG. 1.
Figure 8:
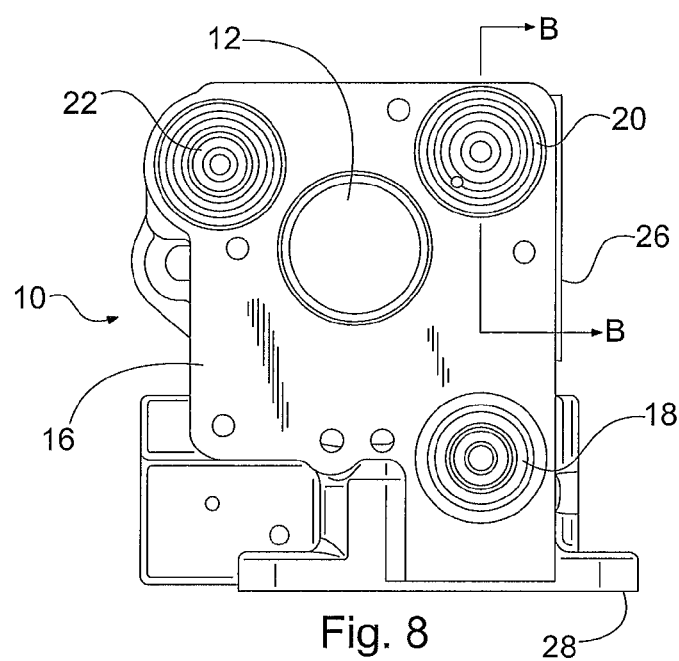
FIG. 8 is a bottom view of the service portion body shown in FIG. 1.
Figure 9:
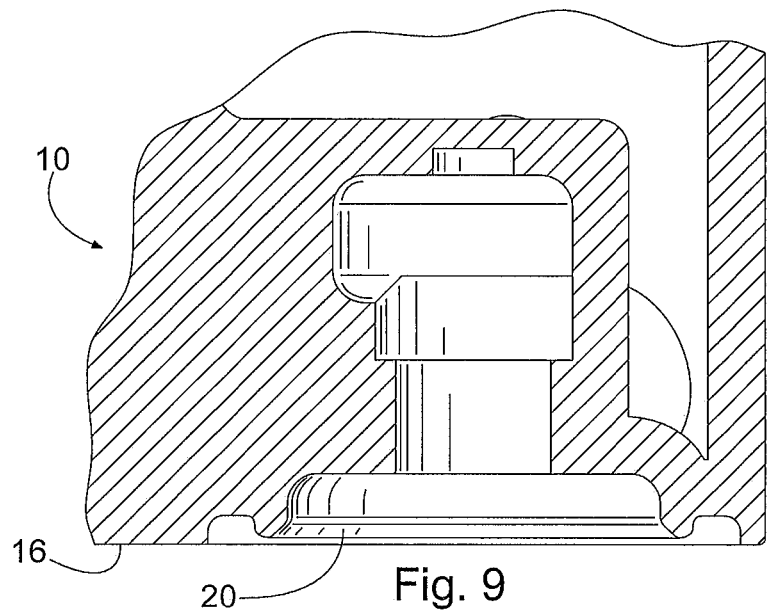
FIG. 9 is a cross-sectional view of the service portion body shown in FIG. 1 along line B-B in FIG. 8.
Figure 10:
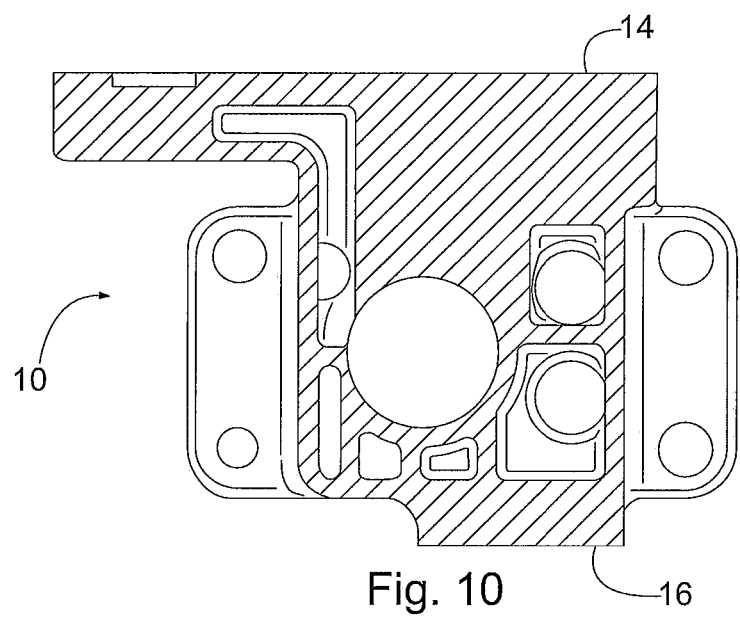
FIGS. 10-15 are various cross-sectional views of the service portion body shown in FIG. 1.
Figure 11:
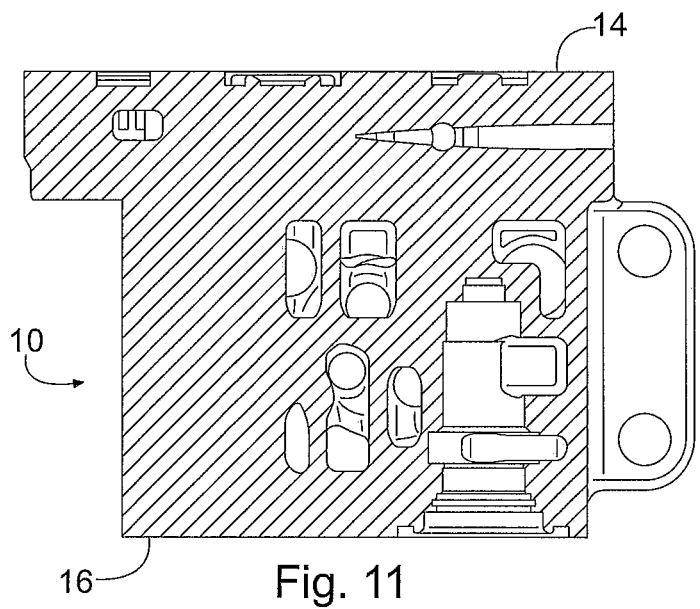
Figure 12:
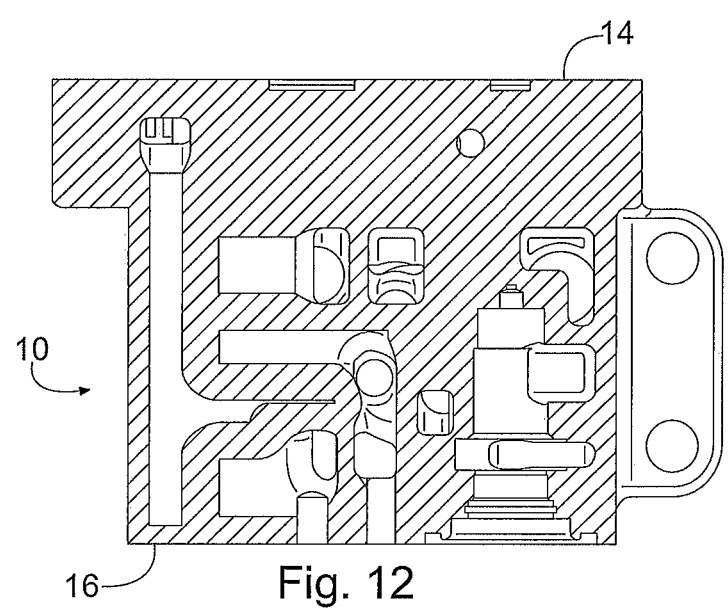
Figure 13:
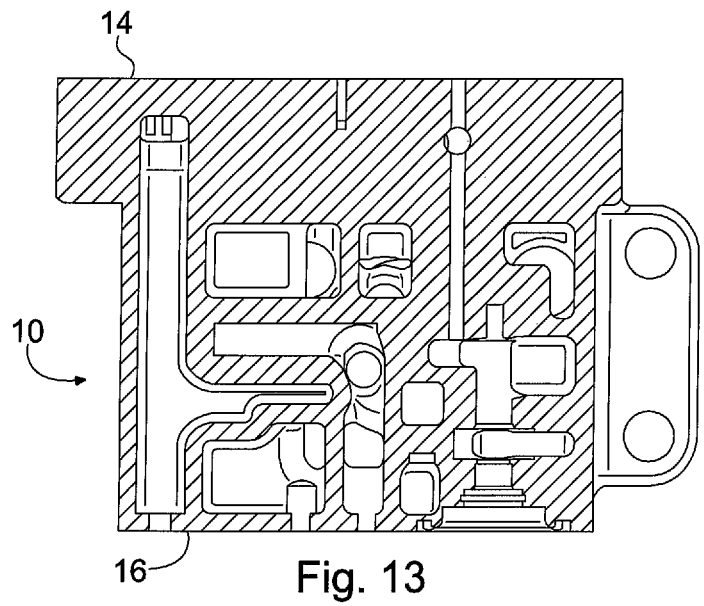
Figure 14:
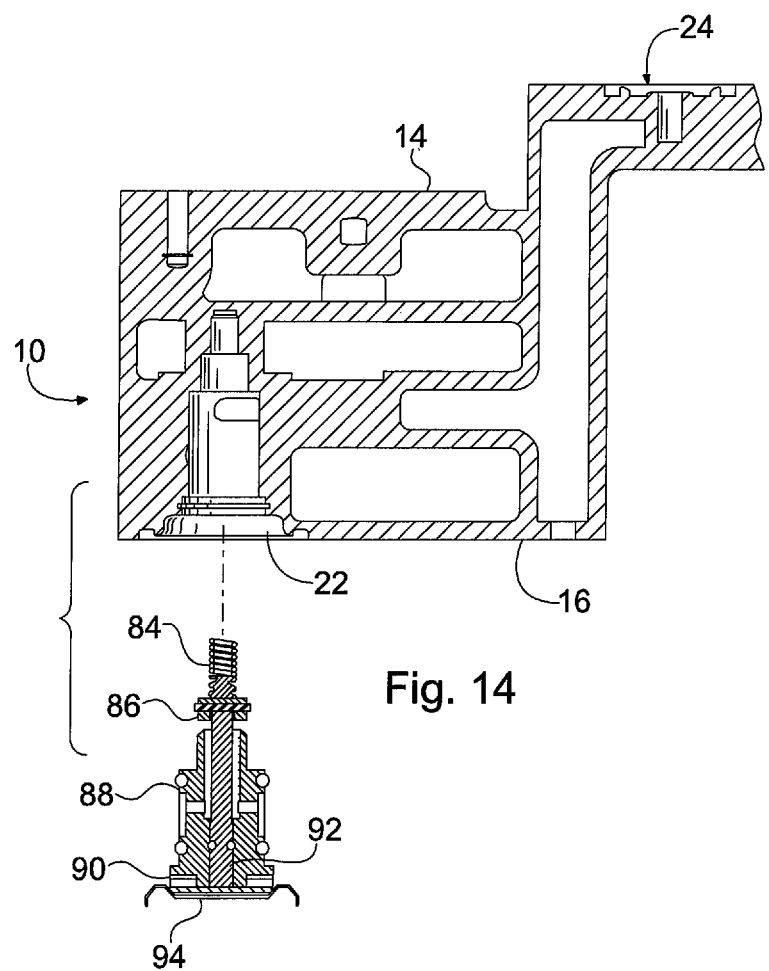
Figure 15:
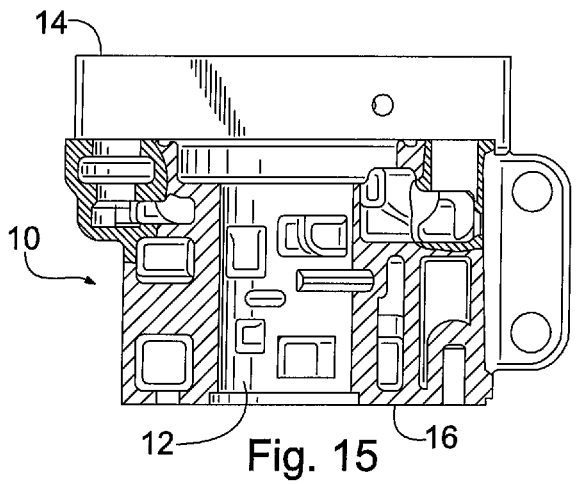
Figure 16:
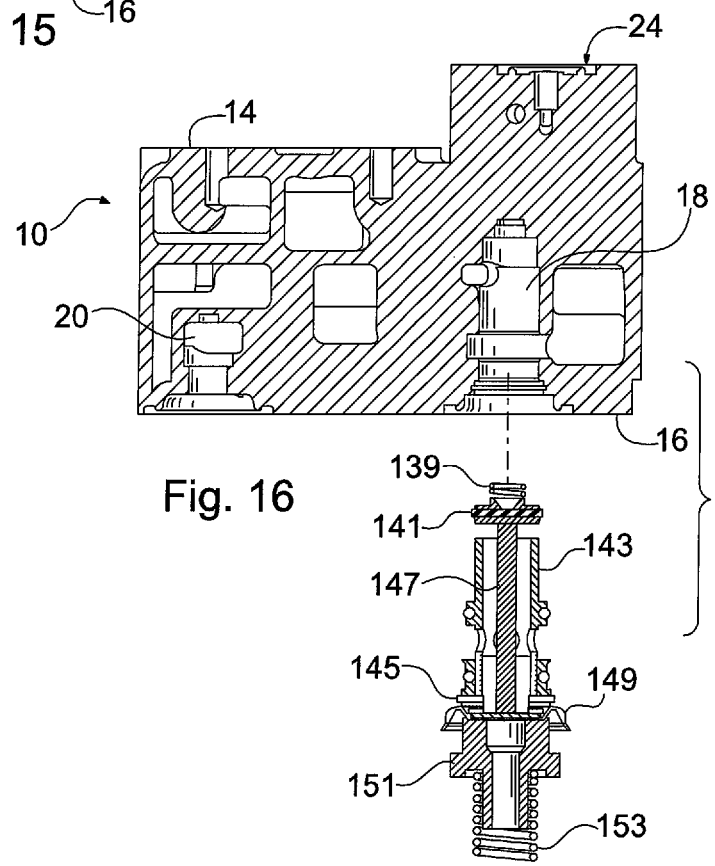
FIG. 16 is a cross-sectional view of the service portion body shown in FIG. 1 along line C-C in FIG. 3.
Figure 17:
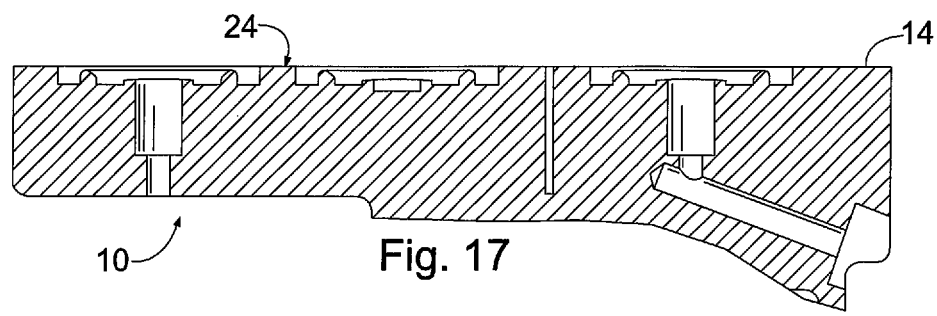
FIG. 17 is a cross-sectional view of the service portion body shown in FIG. 1 along line D-D in FIG. 3.
Figure 18:
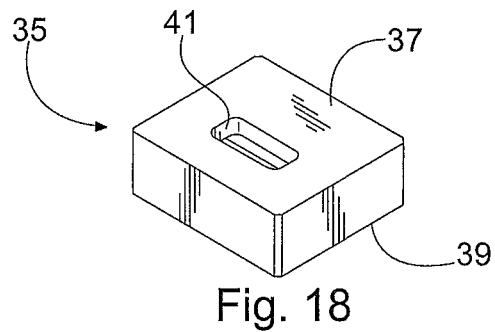
FIG. 18 is a perspective view of a grad valve according to one embodiment.
Figure 19:
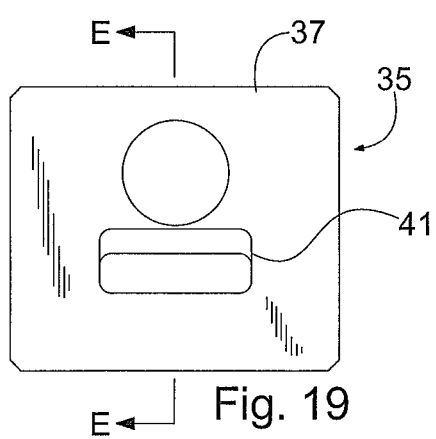
FIG. 19 is a top view of the grad valve shown in FIG. 18.
Figure 20:
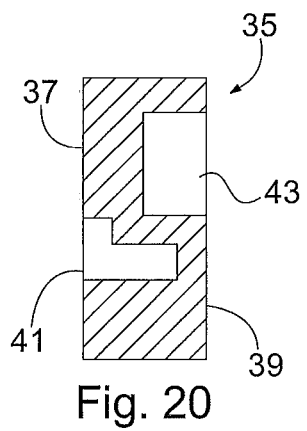
FIG. 20 is a cross-sectional view of the grad valve shown in FIG. 18 along line E-E in FIG. 19.
Figure 21:
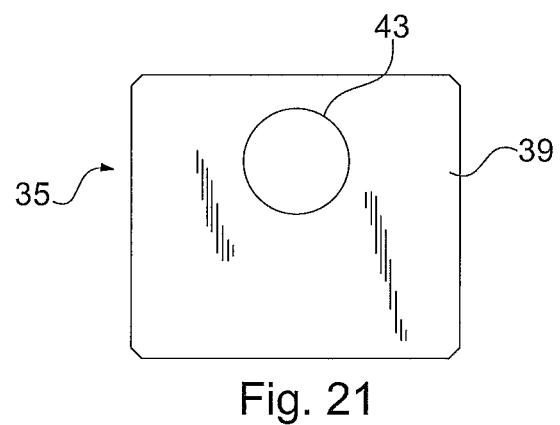
FIG. 21 is a bottom view of the grad valve shown in FIG. 18.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Referring to FIGS. 1-17, one embodiment of a body 10 for a service portion of a rail control valve is disclosed. The body 10 generally defines a piston passageway 12 axially extending from a top 14 of the body 10 to a bottom 16 of the body 10. The body 10 also defines an inshot valve passageway 18, a limiting valve passageway 20, and a service accelerated release (SAR) valve passageway 22 that each extend from the bottom 16 of the body in a direction toward the top 14 of the body. The body 10 also defines a back-flow check valve passageway 21 generally extending from the top 14 of the body 10 towards the bottom 16 of the body 10. The body 10 further includes ECP porting 24 configured to receive an ECP coin plate, a release valve receiving surface 26 configured to engage a release valve, and a pipe bracket receiving surface 28 configured to receive a pipe bracket. The piston passageway 12 receives a service piston assembly (not shown). The limiting valve passageway receives a brake cylinder limiting valve assembly (not shown). The inshot valve passageway and the SAR valve passageway receive an inshot valve and a SAR valve, respectively, which will be discussed in more detail below. The back-flow check valve assembly passageway 21 receives a back-flow check valve assembly, which is also discussed in more detail below.

Referring to FIGS. 18-21, one embodiment of a grad valve 35 is disclosed. The grad valve 35 includes a first surface 37 and a second surface 39. The first surface 37 defines a generally rectangular-shaped opening 41 and the second surface defines a generally circular-shaped opening 43. The grad valve 35 forms part of the overall service piston assembly (not shown) and is received within the piston passageway 12 of the body 10.

Figure 22:
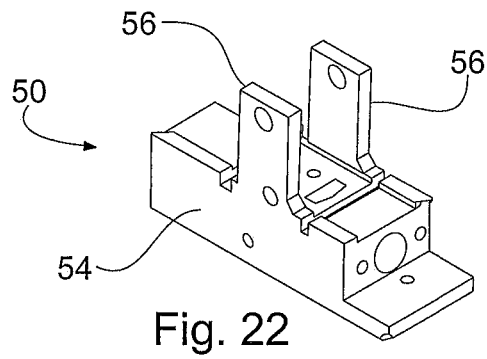
FIG. 22 is a perspective view of a slide valve according to one embodiment.
Figure 23:
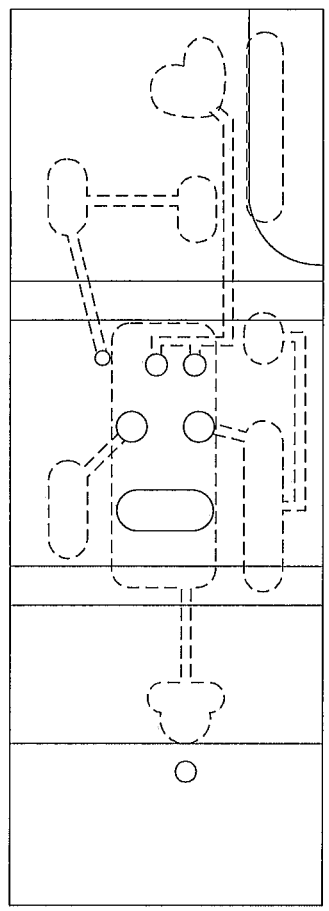
FIG. 23 is a schematic view of porting for a conventional ABDX slide valve.
Figure 24:
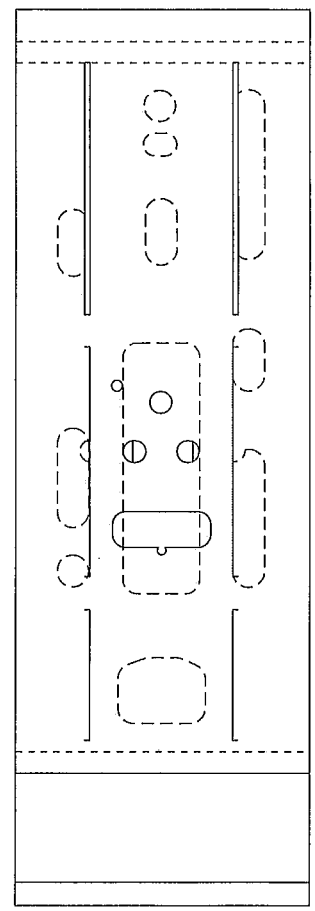
FIG. 24 is a schematic view of porting for a conventional China 120-1 slide valve.
Figure 25:
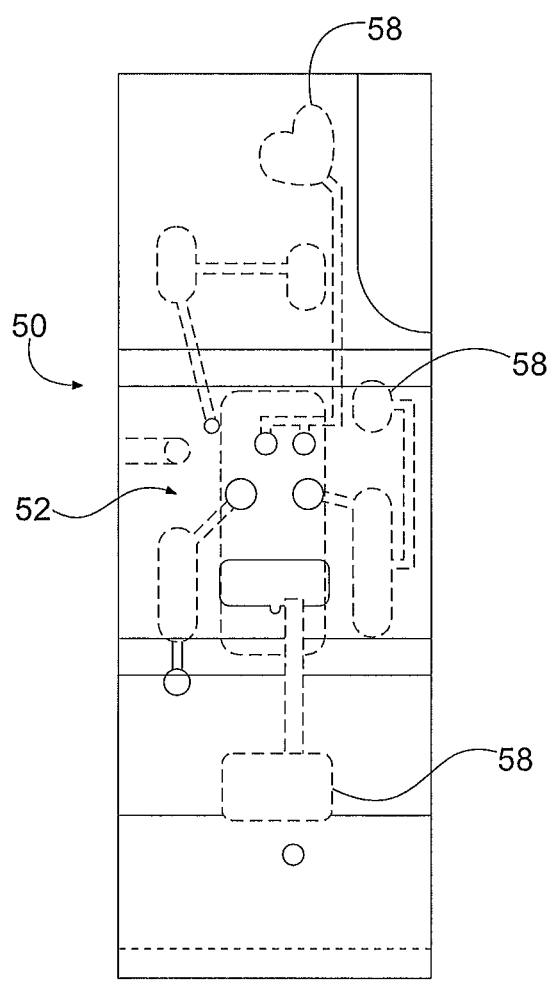
FIG. 25 is a schematic view of portion for the slide valve shown in FIG. 22.

Referring to FIGS. 22 and 25, one embodiment of a slide valve 50 and its corresponding porting pattern 52 is disclosed. The slide valve 50 is also part of the service piston assembly and is received within the piston passageway 12 of the body 10. The slide valve 50 includes a body 54 having a pair of extensions 56. The slide valve body 54 defines a plurality of passages 58 to form the porting pattern 52 as shown in FIG. 25. FIGS. 23 and 24 show the porting pattern for conventional ABDX and China 120-1 slide valves.

Figure 26:
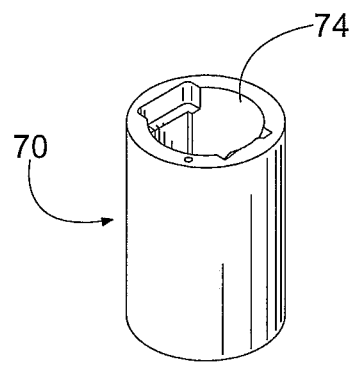
FIG. 26 is a perspective view of a main bushing according to one embodiment.
Figure 27:
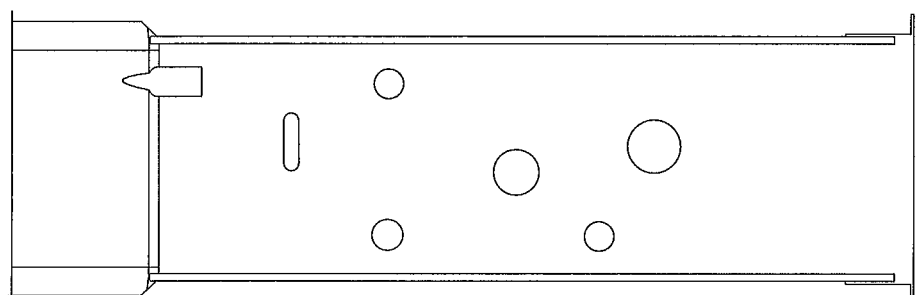
FIG. 27 is a schematic view of porting for a conventional ABDX bushing.
Figure 28:
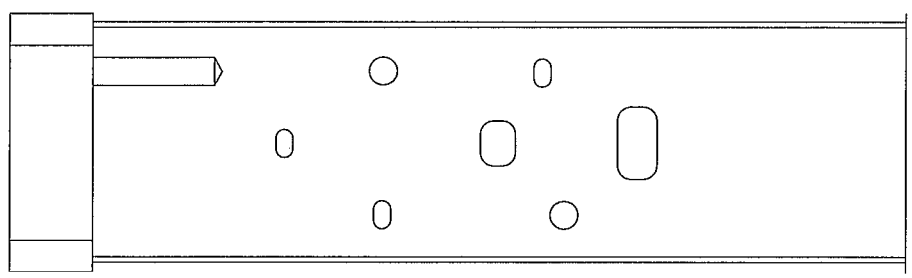
FIG. 28 is a schematic view of porting for a conventional China 120-1 bushing.
Figure 29:
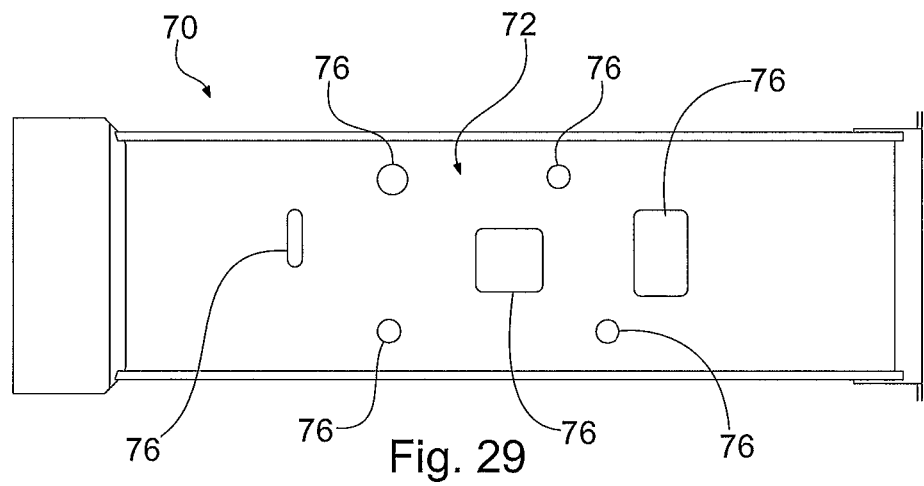
FIG. 29 is a schematic view of portion for the bushing shown in FIG. 26.
Figure 30:
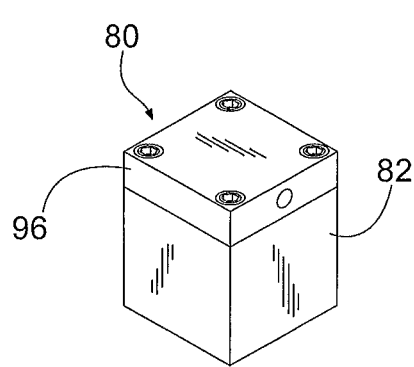
FIG. 30 is a perspective view of a service accelerated release (SAR) valve according to one embodiment.
Figure 31:
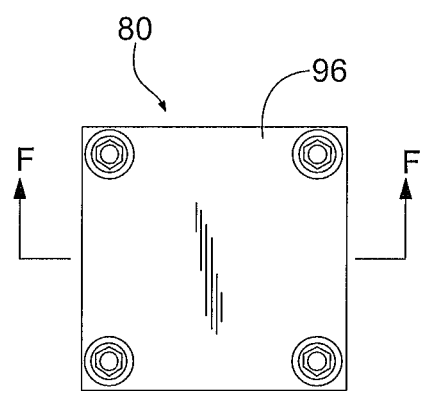
FIG. 31 is a top view of the SAR valve shown in FIG. 30.
Figure 32:
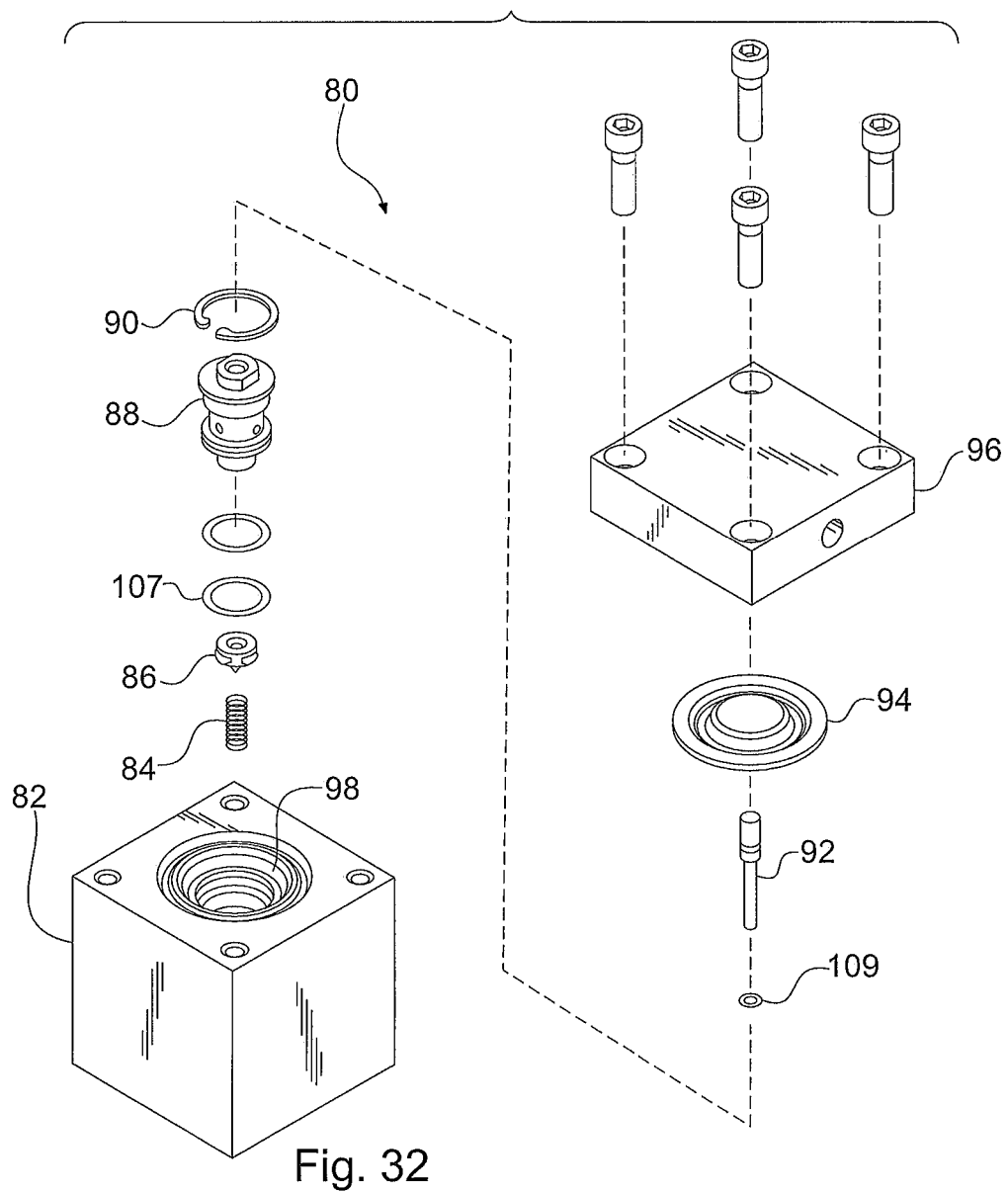
FIG. 32 is an exploded perspective view of the SAR valve shown in FIG. 30.
Figure 38:
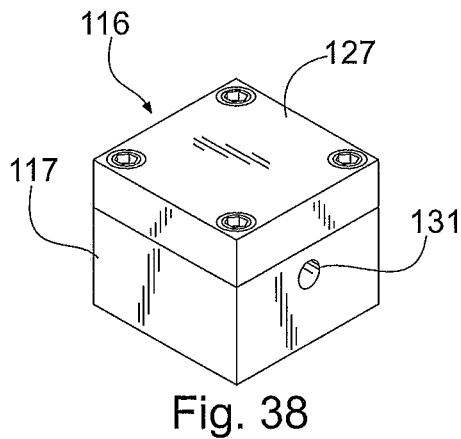
FIG. 38 is a perspective view of a back-flow check valve according to one embodiment.
Figure 39:
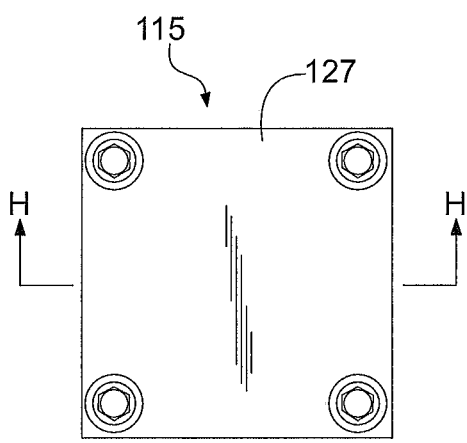
FIG. 39 is a top view of the back-flow check valve shown in FIG. 38.
Figure 40:
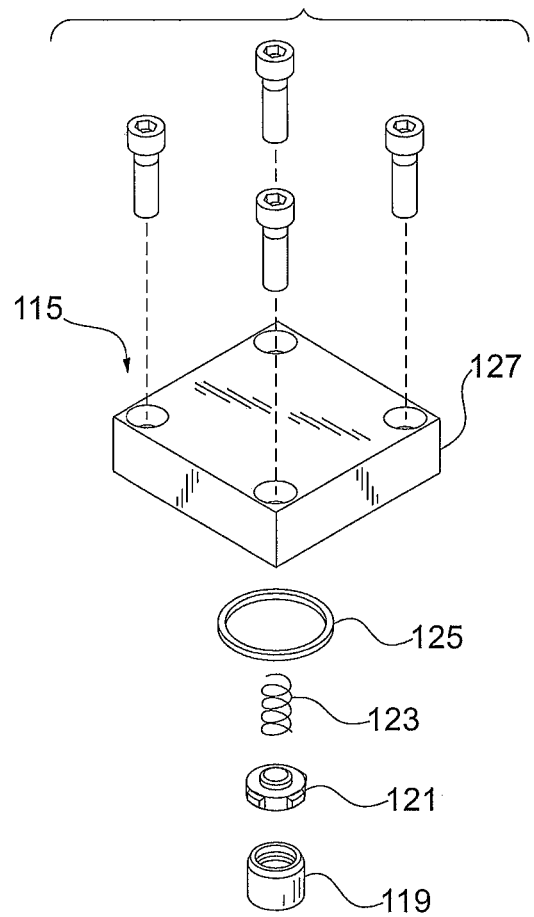
FIG. 40 is an exploded perspective view of the back-flow check valve shown in FIG. 38.
Figure 41:
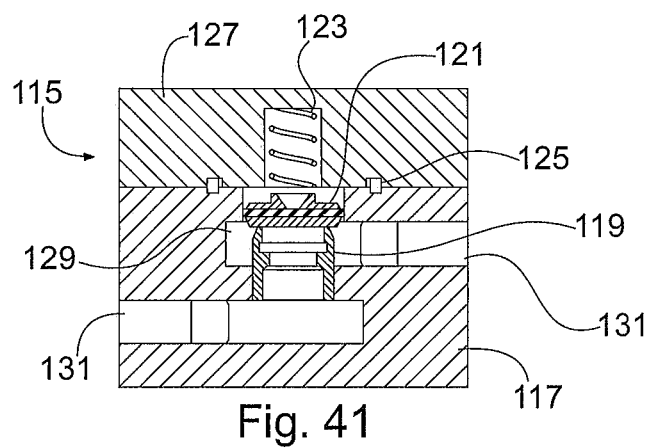
FIG. 41 is a cross-sectional view of the back-flow check valve shown in FIG. 38 along line H-H in FIG. 39, showing the back-flow check valve in a closed position.
Figure 42:
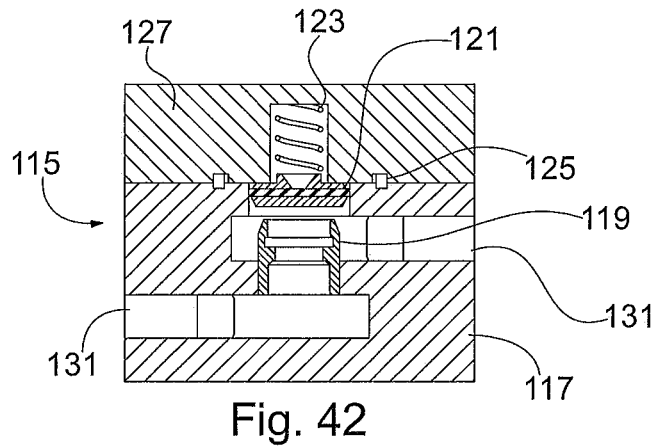
FIG. 42 is a cross-sectional view of the back-flow check valve shown in FIG. 38 along line H-H in FIG. 39, showing the back-flow check valve in an open position.
Figure 43:
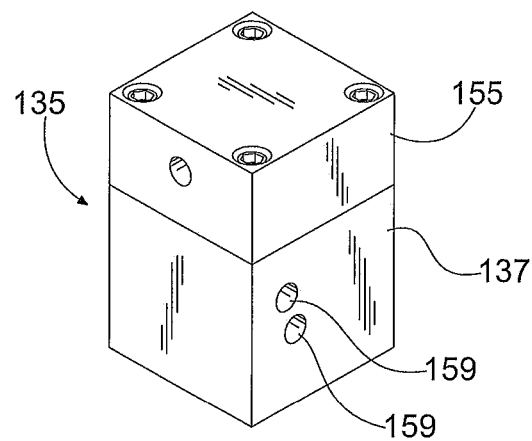
FIG. 43 is a perspective view of an inshot valve according to one embodiment.
Figure 44:
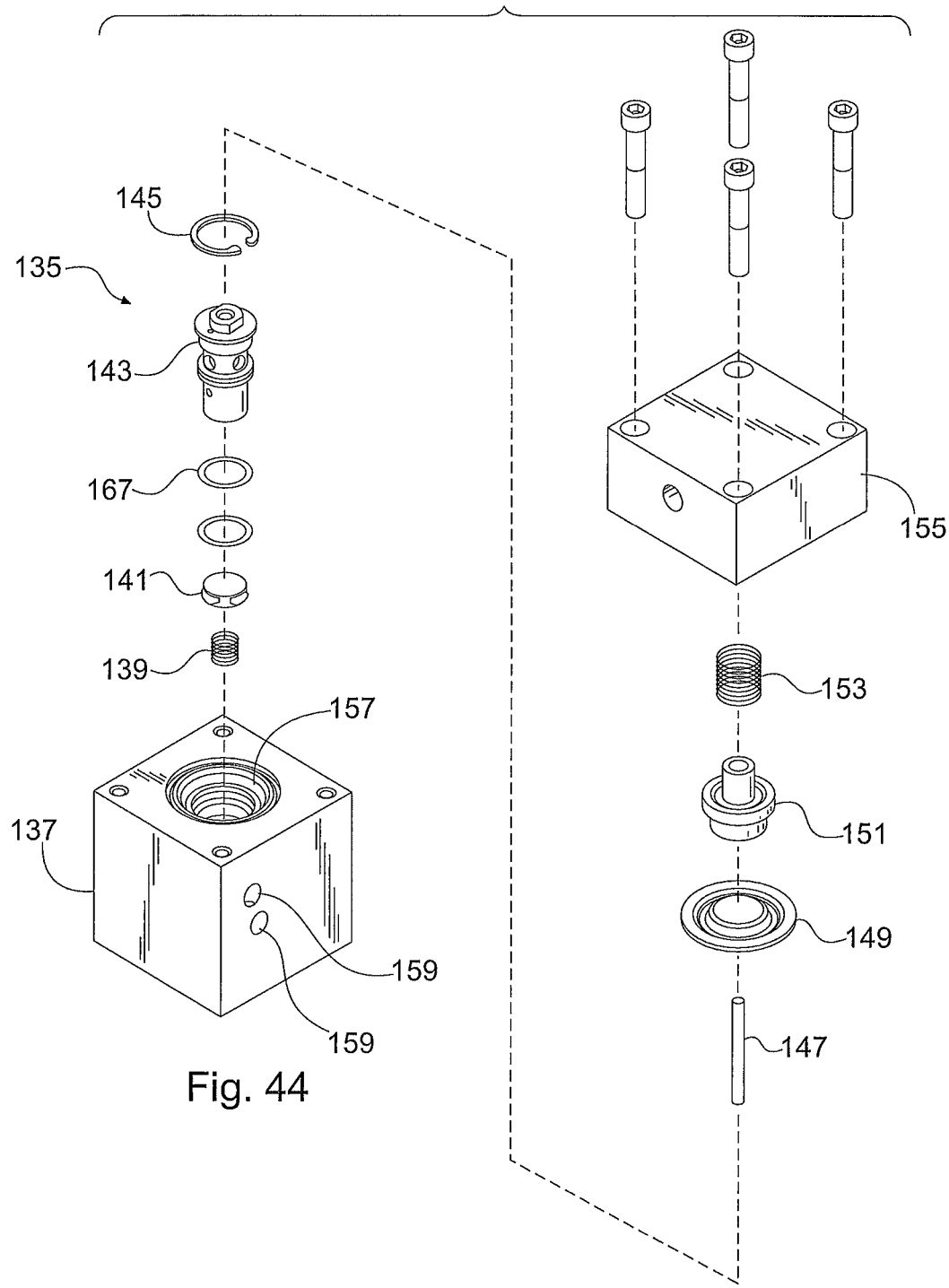
FIG. 44 is an exploded perspective view of the inshot valve shown in FIG. 43.
Figure 45:
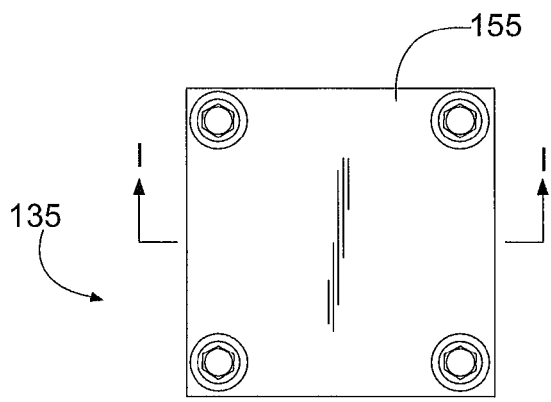
FIG. 45 is a top view of the inshot valve shown in FIG. 43.
Figure 46:
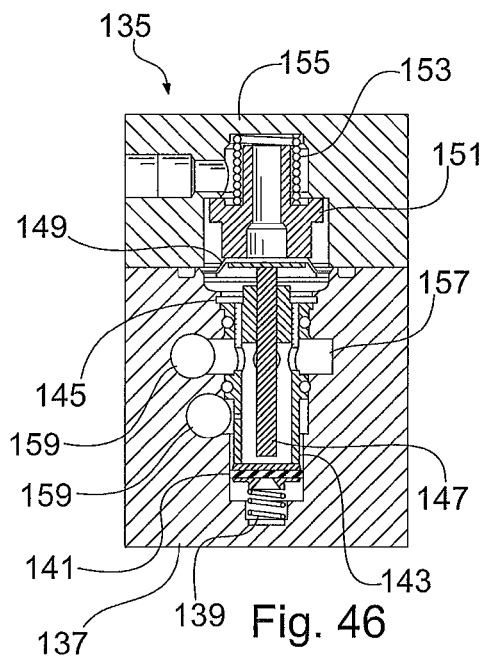
FIG. 46 is a cross-sectional view of the inshot valve shown in FIG. 43 along line I-I in FIG. 45, showing the inshot valve in a closed position.
Figure 47:
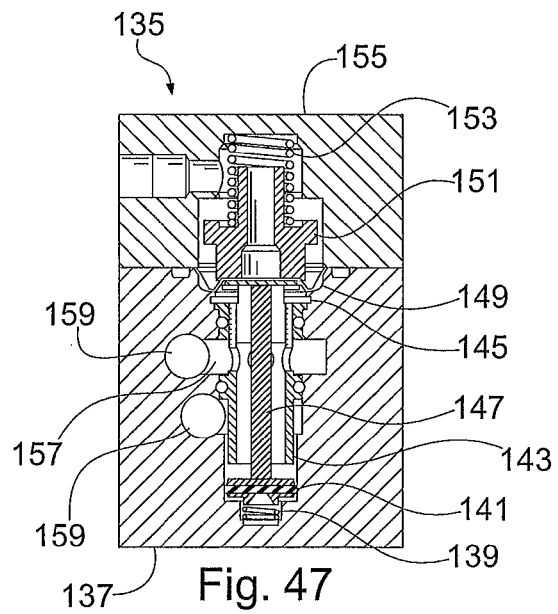
FIG. 47 is a cross-sectional view of the inshot valve shown in FIG. 43 along line I-I in FIG. 45, showing the inshot valve in an open position.
Figure 48:
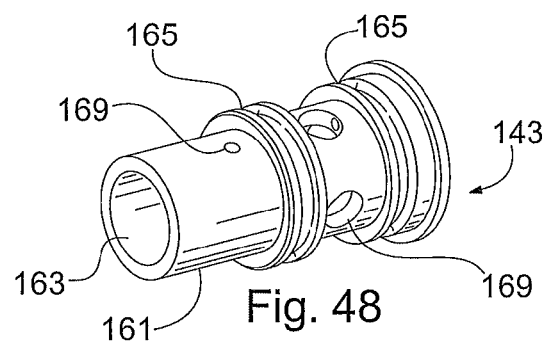
FIG. 48 is a perspective view of an inshot valve bushing according to one embodiment.
Figure 49:
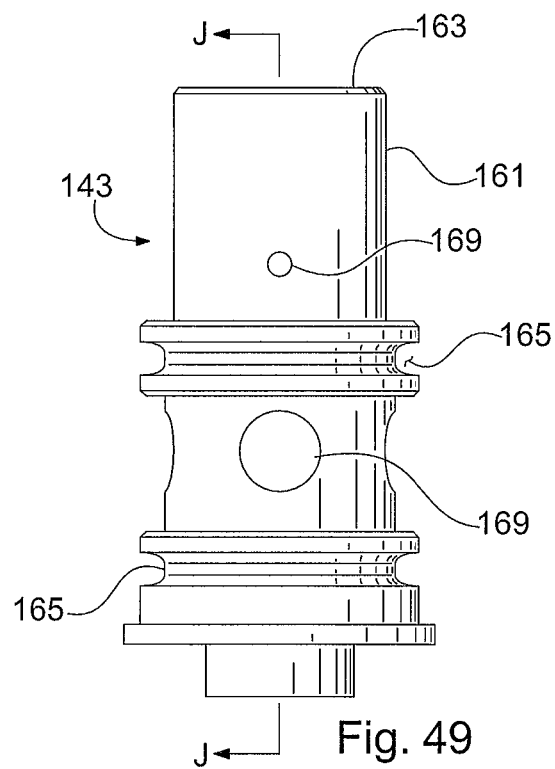
FIG. 49 is a top view of the inshot valve bushing shown in FIG. 48.
Figure 50:
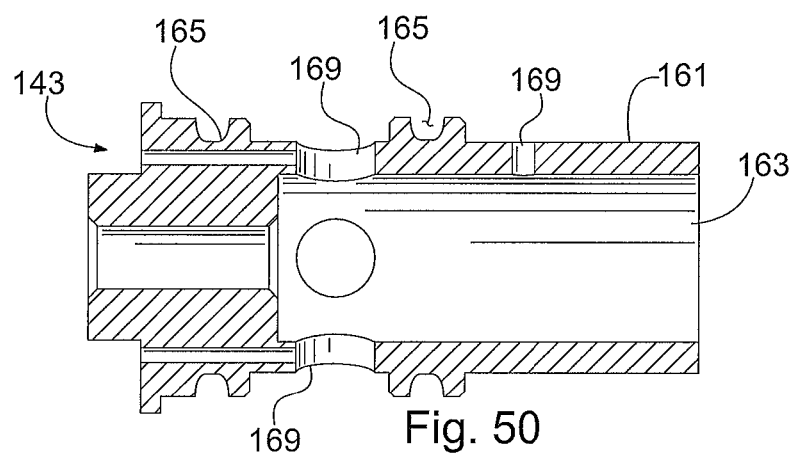
FIG. 50 is a cross-sectional view of the inshot valve bushing shown in FIG. 48 along line J-J in FIG. 49.

Referring to FIGS. 26 and 29, one embodiment of a main bushing 70 and its corresponding porting pattern 72 is disclosed. The main bushing 70 is received within the piston passageway 12 of the body 10 and cooperatively engages the slide valve 50. The main bushing 70 is generally cylindrical-shaped having a central passageway 74 for receiving the slide valve 50 and the remaining piston assembly. The bushing 70 defines a plurality of passages 76 to form the porting pattern 72 as shown in FIG. 29. FIGS. 27 and 28 show the porting pattern for conventional ABDX and China 120-1 bushings.

Referring to FIGS. 30-37, one embodiment of a SAR valve 80 is disclosed. The SAR valve 80 includes a body 82, a spring 84, a check valve 86, a bushing 88, a retaining ring 90, a plunger 92, a diaphragm 94, and a cover 96. The body 82 defines a passageway 98 for receiving the spring 84, check valve 86, bushing 88, retaining ring 90, plunger 92, and diaphragm 94. Although the body 82 is shown as a distinct component, the SAR valve 80 may be received in the SAR valve passageway 22 of the service portion body 10 of the control valve as discussed above. In particular, the spring 84, check valve 86, bushing 88, retaining ring 90, plunger 92, and diaphragm 94 of the SAR valve 80 would be received by the SAR valve passageway 22 of the service portion body 10 in the same manner as shown in FIGS. 30-34. The SAR valve 80 has a closed position (shown in FIG. 33) and an open position (shown in FIG. 34). The SAR valve bushing 88, shown more clearly in FIGS. 35-37, includes a body 101 defining a central passageway 103. The bushing 88 includes a pair of spaced seats 105 for receiving o-rings 107. The plunger 92 is axially moveable within the central passageway 103 of the bushing 88 and also includes an o-ring 109. The body 101 of the bushing also defines a pair of radially extending passages 111 that intersect the central passageway 103. The diaphragm 94 may be a thin section rubber compound diaphragm having internal fabric and a brass insert.

Referring to FIGS. 38-42, one embodiment of a back-flow check valve 115 is disclosed. The back-flow check valve 115 includes a body 117, a bushing 119, a check valve member 121, a spring 123, a gasket 125, and a cover 127. The body 117 defines a central passageway 129 for receiving the bushing 119, check valve member 121, and spring 123. Although the back-flow check valve 115 is shown as a distinct component, the back-flow check valve 115 may be received in the back-flow check valve passageway 21 in the service portion body 10 of the control valve. The back-flow check valve 115 has a closed position (shown in FIG. 41) and an open position (shown in FIG. 42). The body 117 also defines a pair of passageways 131 extending from each side of the body 117, which are in fluid communication with the central passageway 129.

Referring to FIGS. 43-50, one embodiment of an inshot valve 135 is disclosed. The inshot valve 135 includes a body 137, a valve spring 139, a check valve 141, a bushing 143, a retaining ring 145, a pushrod 147, a diaphragm 149, a follower 151, a follower spring 153, and a cover 155. The inshot valve body 137 defines a central passageway 157 for receiving the valve spring 139, check valve 141, bushing 143, retaining ring 145, pushrod 147, diaphragm 149, follower 151, and follower spring 153. Although the inshot valve body 137 is shown as a distinct component, the inshot valve 135 may be received in the inshot valve passageway 18 of the service portion body 10 of the control valve as discussed above. In particular, the valve spring 139, check valve 141, bushing 143, retaining ring 145, pushrod 147, diaphragm 149, follower 151, and follower spring 153 would be received by the inshot valve passageway 18 of the service portion body 10 in the same manner as shown in FIGS. 43-50. The inshot valve body 137 also defines a pair of passageways 159 extending from a side of the body 137, which are in fluid communication with the central passageway 157. The inshot valve 135 has a closed position (shown in FIG. 46) and an open position (shown in FIG. 47). The inshot valve bushing 143, shown more clearly in FIGS. 48-50, includes a body 161 defining a central passageway 163. The bushing 143 includes a pair of seats 165 for receiving o-rings 167. The body 161 of the bushing 143 also defines a plurality of radially extending passageways 169 that are in fluid communication with the central passageway 163 of the bushing 143. The pushrod 147 is movable within the central passageway 163 of the bushing 143. The diaphragm 149 may be a thin section rubber compound diaphragm having internal fabric and a brass insert.

Figure 51:
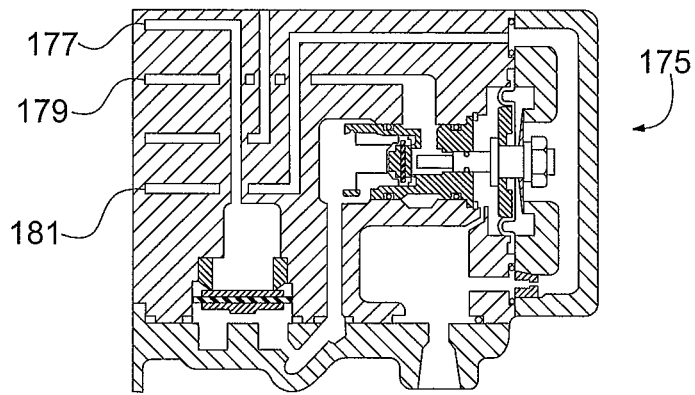
FIG. 51 is a cross-sectional view of a conventional China 120-1 accelerated release valve, showing a release and charging position.
Figure 52:
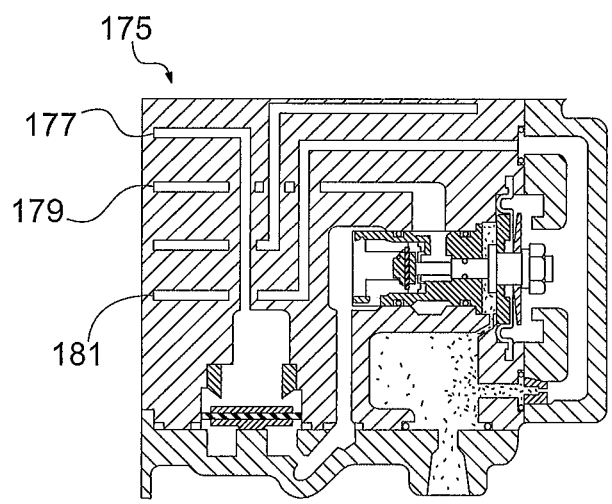
FIG. 52 is a cross-sectional view of a conventional China 120-1 accelerated release valve, showing an accelerated release position.

Referring to FIGS. 51 and 52, a release and charging position and an accelerated release position of a conventional China 120-1 accelerated release valve 175 are shown. The conventional China 120-1 accelerated release valve 175 includes an accelerated release passageway 177, a brake pipe passageway 179, and a brake cylinder 181 (retainer exhaust) passageway. The conventional China 120-1 accelerated release valve 175 uses retainer exhaust 181 to actuate accelerated release and has a floating piston design, which can be susceptible to vibration damage. A back-flow check valve is needed for dry charge to prevent accelerated release reservoir charging through the accelerated release valve 175. The back-flow check valve also prevents accelerated release charging through the accelerated release valve while brake cylinder pressure in the retainer exhaust port is still somewhat high (above 4-5 psi).

Figure 53:
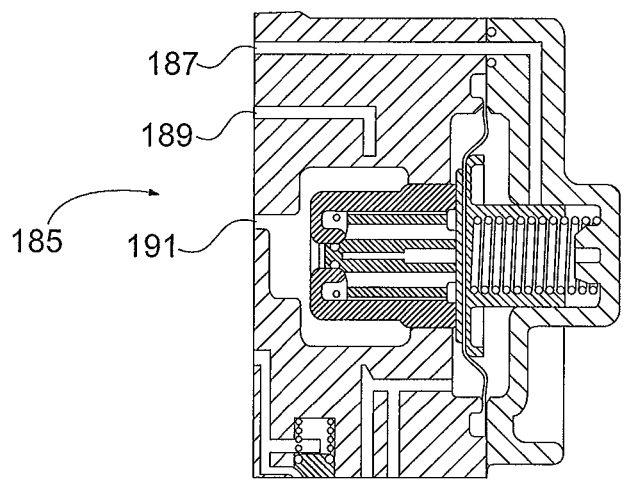
FIG. 53 is a cross-sectional view of a conventional ABDX SAR valve.

Referring to FIG. 53, a conventional ABDX SAR valve 185 is shown. The conventional ABDX SAR valve 185 utilizes an auxiliary reservoir passageway 187, a brake pipe passageway 189, and an emergency reservoir passageway 191. The conventional ABDX SAR valve 185 uses Brake Pipe/Auxiliary differential to actuate the SAR valve. The use of a back-flow check valve is not necessary.

Figure 54:
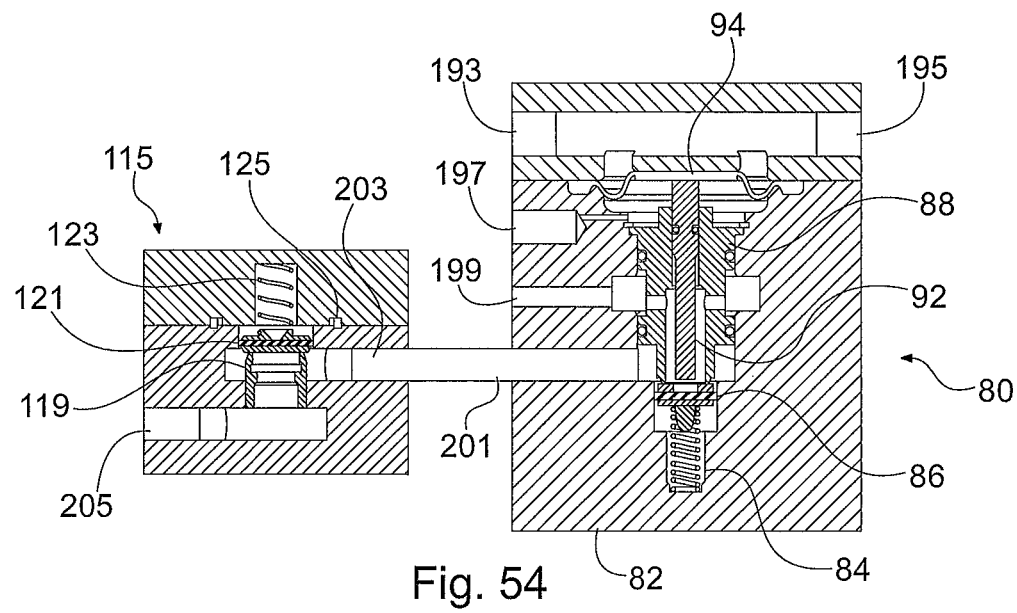
FIG. 54 is cross-sectional view of the SAR valve shown in FIG. 30 and the back-flow check valve shown in FIG. 38, showing a closed position of the valves.
Figure 55:
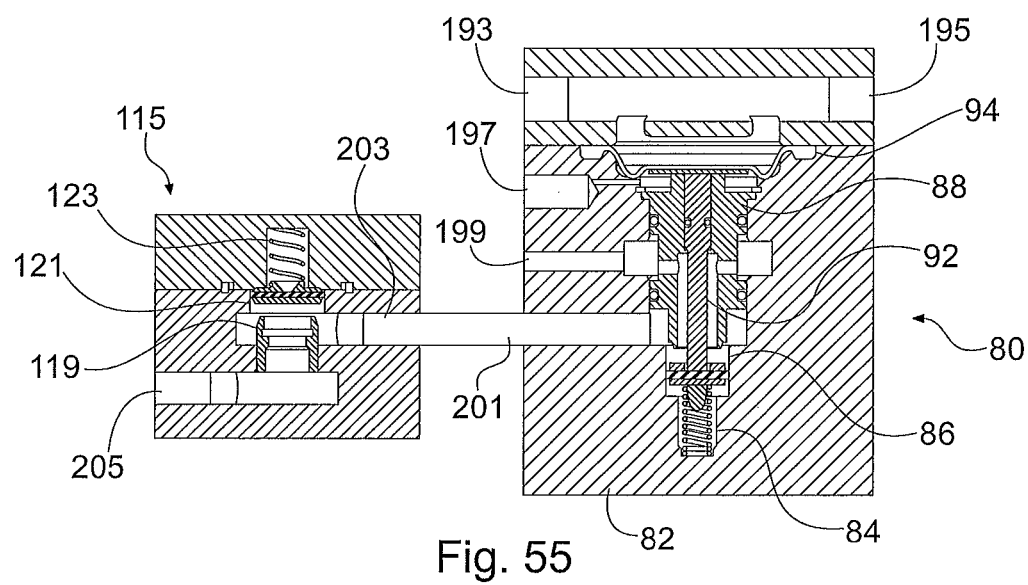
FIG. 55 is cross-sectional view of the SAR valve shown in FIG. 30 and the back-flow check valve shown in FIG. 38, showing an open position of the valves.

Referring to FIGS. 54 and 55, the SAR valve 80 and back-flow check valve 115 shown in FIGS. 30-42 and described above are shown operatively connected to each other. The SAR valve 80 includes a brake cylinder exhaust passageway 193, first and second atmospheric vent passageways 195, 197, a brake pipe passageway 199, and a check valve passageway 201. The back-flow check valve 115 includes a check valve passageway 203 and an accelerated release reservoir passageway 205. The SAR valve 80 uses brake cylinder exhaust pressure 193 to open the SAR valve 80. The open position of the SAR valve 80 and back-flow check valve 115 is shown in FIG. 55 and the closed position of the SAR valve 80 and back-flow check valve 115 is shown in FIG. 54. After the SAR valve 80 opens, the valve allows accelerated release reservoir pressure 205 to flow into the brake pipe to help recharge the brake pipe.

Figure 56:
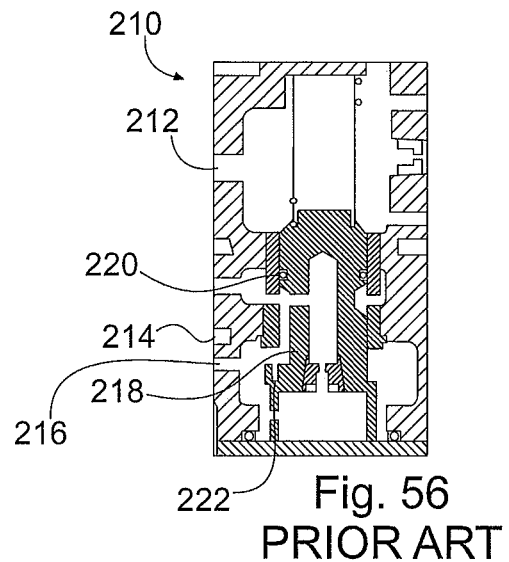
FIG. 56 is a cross-sectional view of a conventional China 120-1 emergency inshot valve, showing a release and charging position.
Figure 57:
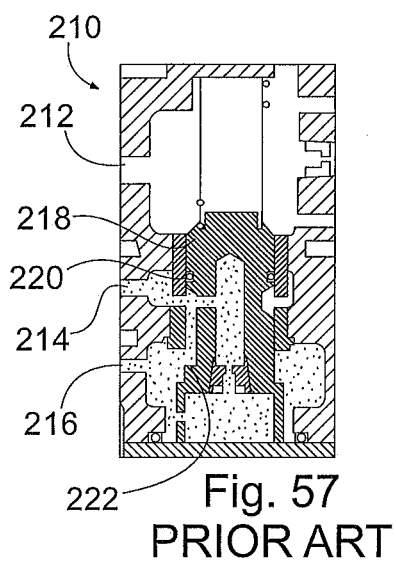
FIG. 57 is a cross-sectional view of a conventional China 120-1 emergency inshot valve, showing a service position.
Figure 58:
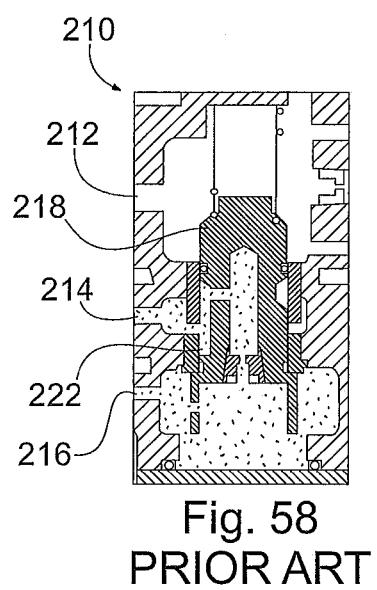
FIG. 58 is a cross-sectional view of a conventional China 120-1 emergency inshot valve, showing an emergency position.

Referring to FIGS. 56-58, a release and charging position, a service position, and an emergency position of a conventional China 120-1 inshot valve 210 are shown. The conventional China 120-1 inshot valve 210 includes a brake pipe passageway 212, a brake cylinder "out" passageway 214, and a brake cylinder "in" passageway 216. In the release and service positions (FIGS. 56 and 57), a spool 218 of the valve has only one o-ring 220 in bore and brake pipe pressure acting on the o-ring 220 along with the spring holding the inshot spool in the open position. When brake pipe pressure is removed or significantly lower than brake cylinder pressure, the spool 218 moves up to the closed position and the other o-ring 222 seals off the unrestricted flow of brake cylinder "in" 216 to brake cylinder "out" 214. In the closed position, brake cylinder pressure is restricted by the choke in the spool 218.

Figure 59:
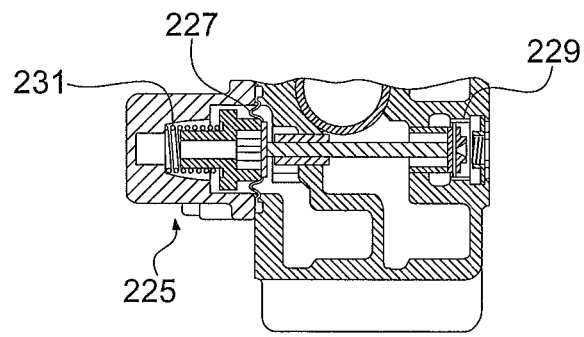
FIG. 59 is a cross-sectional view of a conventional ABDX emergency inshot valve.

Referring to FIG. 59, a conventional ABDX inshot valve 225 is shown. In the release position, there is no pressure on the diaphragm 227 or check valve 229 and the spring 231 on the left of the diaphragm 227 holds the inshot valve 225 open. During service applications, brake cylinder pressure is on both sides of the diaphragm 227 and flows unrestricted past the check valve 229, because the diaphragm spring 231 is holding the inshot open. During emergency applications, the high pressure spool cuts off the feed of brake cylinder pressure to the spring side of the diaphragm 227. Brake cylinder pressure continues to increase on the right side of the diaphragm 227 and eventually overcomes the spring 231 and moves the diaphragm 227 to the left. After the diaphragm 227 is moved, the flow of brake cylinder pressure along with the check valve spring close the check valve 229 and any further brake cylinder build-up is restricted through a hole in the check valve seat.

Figure 60:
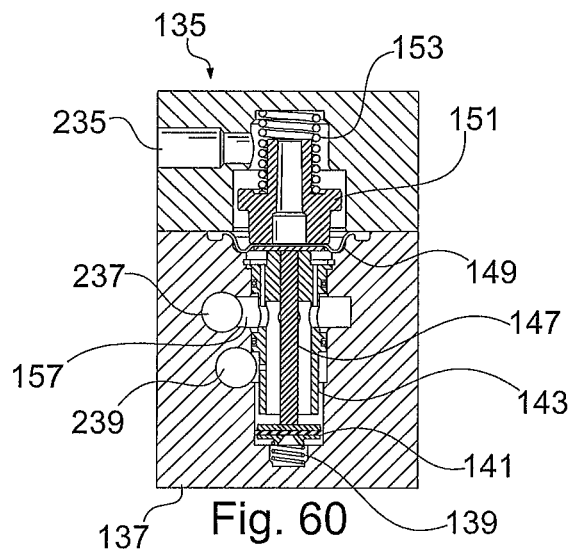
FIG. 60 is a cross-sectional view of the inshot valve shown in FIG. 43, showing the valve in an open position.
Figure 61:
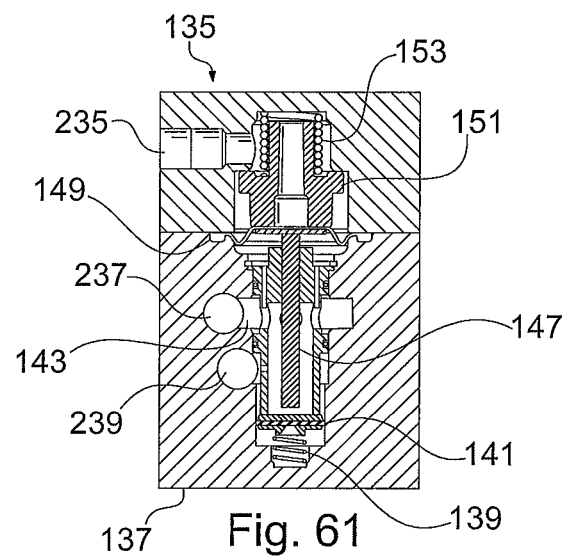
FIG. 61 is a cross-sectional view of the inshot valve shown in FIG. 43, showing the valve in a closed position.
Figure 62:
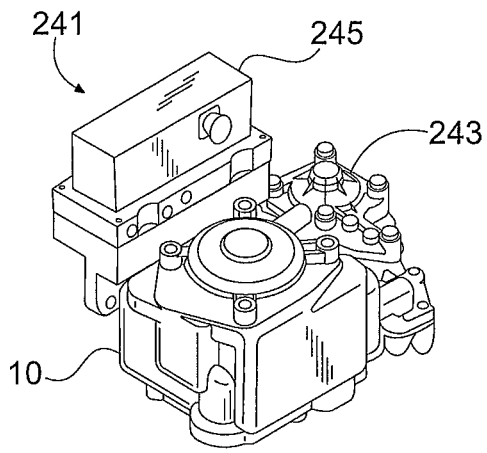
FIG. 62 is a front perspective view of the service portion body of FIG. 1.
Figure 63:
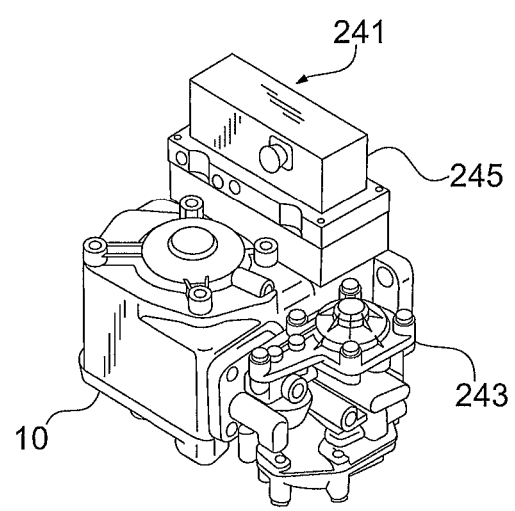
FIG. 63 is a rear perspective view of the service portion body of FIG. 1.
Figure 64:
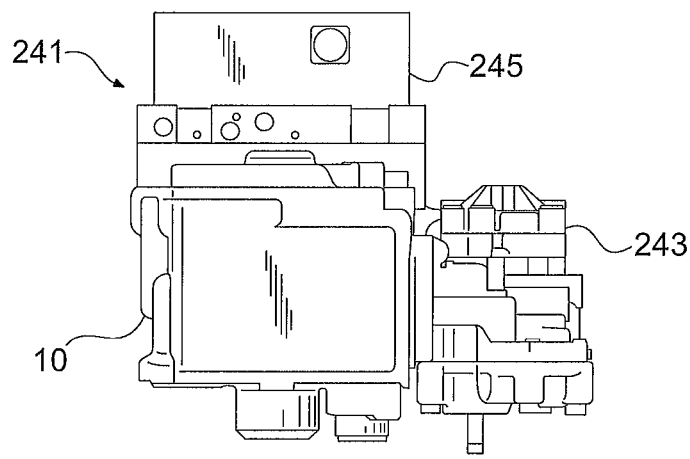
FIG. 64 is a side view of the service portion body of FIG. 1.
Figure 65:
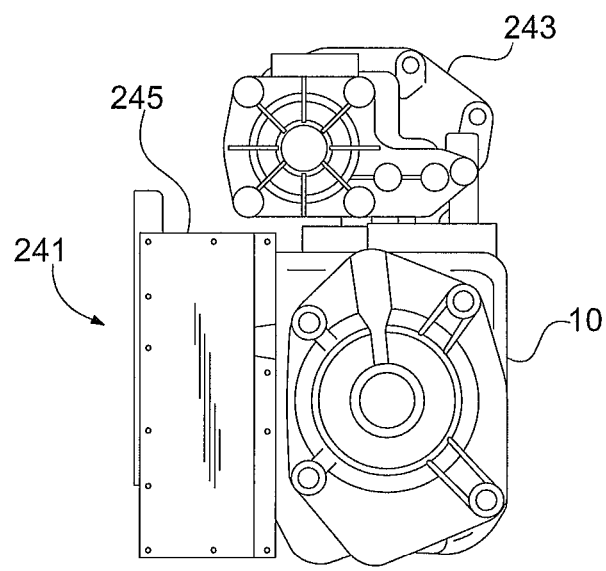
FIG. 65 is a top view of the service portion body of FIG. 1.
Figure 66:
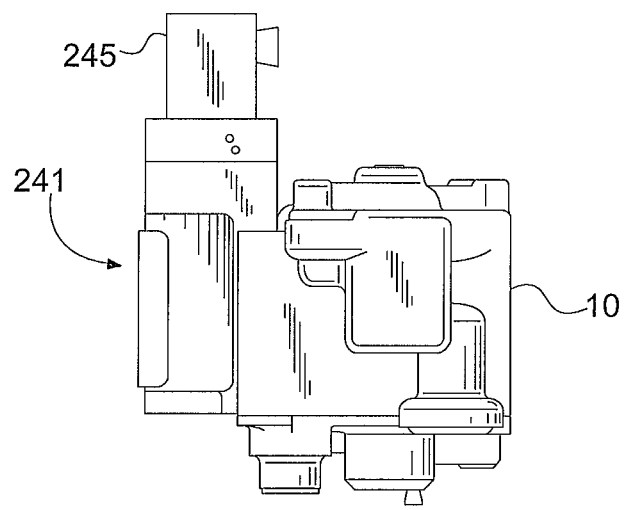
FIG. 66 is a front view of the service portion body of FIG. 1.

Referring to FIGS. 60 and 61, the inshot valve 135 shown in FIGS. 43-50 and described above is shown in a closed position and an open position. The inshot valve 135 includes a brake pipe passageway 235, a brake cylinder "out" passageway 237, and a brake cylinder "in" passageway 239. The inshot valve 135 is normally in the open position (shown in FIG. 60) allowing unrestricted flow of brake cylinder pressure (brake cylinder "in" 239 to brake cylinder "out" 237). When brake pipe pressure is removed or significantly lower than brake cylinder pressure, the diaphragm 149 moves upward allowing the check valve 141 to close. When closed, the brake cylinder pressure flow through the inshot valve 135 is restricted by the opening in the side 169 of the bushing 143 to slow down the build-up of brake cylinder pressure (inshot function).

Referring to FIGS. 62-66, an assembled service portion 241 of a brake control valve is shown. The service portion 241 includes the body 10 having, among other components, the SAR valve 80, back-flow check valve 115, and inshot valve 135. A release valve 243 is also attached to the body 10 at the release valve receiving surface 26. The service portion 241 is shown with an ECP coin plate 245 engaged with the ECP porting 24 on the body 10.

The service portion 241 including the body 10, main piston bushing 70, slide valve 50, grad valve 35, SAR valve 80, back-flow check valve 115, and inshot valve 135 may be used in place of the Chinese 120 or 120-1 and provides an extended service life and more reliable operation relative to conventional valves. The various diaphragms in the service portion are suitable for low temperature operation and extend the service life. In addition, the service portion incorporates air passages in the main body that provide for the addition of an Electronically Controlled Pneumatic (ECP) brake system. The air passages for the ECP brake system may be formed integrally with the main body. The service portion 241 may also be utilized in the American Association of Railroads (AAR) market, where typical control valves are composed of a pipe bracket, a service portion, and an emergency portion. The pipe bracket serves primarily as a mounting bracket for the service and emergency portion. The service portion 241 may combine most operational functions into the service portion and leave a vent valve function in the emergency portion. Additionally, previous features found in the emergency portion of conventional AAR control valves, such as the accelerated application and in-shot, are moved to the service portion 241 of the control valve. Additionally, an Electronically Controlled Pneumatic (ECP) brake capability is provided in the main body of the service portion 241 of the control valve described in detail herein. With the control valve described in detail herein, it is easier to determine which portion of the control valve is defective and replace just the defective portion. Further, as most of the operational functions are located in the service portion 241, replacing just that portion typically will correct any problems. The service portion 241 of the control valve includes air passages in the service portion body that allow ECP overlay functionality to be included in the service portion. The service portion of the control valve may also specifically include the in-shot valve. Moreover, the vent valve function in the emergency portion of the control valve may use brake pipe and quick action chamber volume.

While several embodiments were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A service portion of a rail control valve comprising:
   a body defining a piston passageway, an inshot valve passageway, and a service accelerated release valve passageway;
   an inshot valve received by the inshot valve passageway of the body; and
   a service accelerated release valve received by the service accelerated release valve passageway, wherein the body includes ECP porting configured to receive an ECP coin plate.

2. The service portion of claim 1, wherein the inshot valve comprises:
   a bushing having a body;
   a pushrod received in a central passageway of the body of the bushing;
   a diaphragm operatively connected to the pushrod; a check valve positioned at a first end of the bushing of the inshot valve; and
   a follower positioned at a second end of the bushing of the inshot valve, the pushrod movable within the central passageway of the bushing and configured to displace the diaphragm, the check valve, and the follower, the inshot valve having an open position and a closed position.

3. The service portion of claim 2, wherein the inshot valve further comprises a valve spring engaged with the check valve, and a follower spring engaged with the follower.

4. The service portion of claim 3, wherein the body of the bushing of the inshot valve defines a pair of spaced apart seats for receiving a pair of o-rings.

5. The service portion of claim 2, wherein the diaphragm of the inshot valve comprises a thin section rubber diaphragm having internal fabric and a brass insert.

6. The service portion of claim 4, wherein a retaining ring secures the bushing of the inshot valve within the body.

7. The service portion of claim 1, further comprising a back-flow check valve received within a back-flow check valve passageway defined by the body of the service portion.

8. The service portion of claim 7, wherein the back-flow check valve comprises:
   a bushing;
   a check valve configured to engage the bushing; and
   a spring engaging the check valve, the back-flow check valve having an open position and a closed position.

9. The service portion of claim 1, wherein the service accelerated release valve comprises:
   a bushing having a body;
   a plunger received in a central passageway of the body of the bushing;
   a diaphragm operatively connected to the plunger; a check valve; and
   a spring engaged with the check valve, the plunger movable within the central passageway of the bushing and configured to displace the diaphragm and check valve, the service accelerated release valve having an open position and a closed position.

10. A service portion of a rail control valve comprising:
    a body defining a piston passageway, an inshot valve passageway, and a service accelerated release valve passageway;
    an inshot valve received by the inshot valve passageway of the body; and
    a service accelerated release valve received by the service accelerated release valve passageway, wherein the service accelerated release valve comprises:
    a bushing having a body;
    a plunger received in a central passageway of the body of the bushing;
    a diaphragm operatively connected to the plunger; a check valve; and
    a spring engaged with the check valve, the plunger movable within the central passageway of the bushing and configured to displace the diaphragm and check valve, the service accelerated release valve having an open position and a closed position.

11. The service portion of claim 10, wherein the diaphragm of the service accelerated release valve comprises a thin-section rubber diaphragm having internal fabric and a brass insert.

12. The service portion of claim 10, wherein the body of the bushing of the service accelerated release valve defines a pair of spaced apart seats for receiving a pair of o-rings.

13. The service portion of claim 12, wherein a retaining ring secures the bushing of the service accelerated release valve within the body.

14. A service portion of a rail control valve comprising:
    a body defining a piston passageway, an inshot valve passageway, and a service accelerated release valve passageway;
    an inshot valve received by the inshot valve passageway of the body, the inshot valve comprising an inshot bushing having a body, a pushrod received in a central passageway of the body of the inshot bushing, an inshot diaphragm operatively connected to the pushrod, an inshot check valve positioned at a first end of the inshot bushing, and a follower positioned at a second end of the bushing of the inshot valve, the pushrod movable within the central passageway of the inshot bushing and configured to displace the inshot diaphragm, the inshot check valve, and the follower, the inshot valve having an open position and a closed position; and
    a service accelerated release valve received by the service accelerated release valve passageway, the service accelerated release valve comprising a service accelerated valve bushing having a body, a plunger received in a central passageway of the body of the service accelerated valve bushing, a service accelerated valve diaphragm operatively connected to the plunger, a service accelerated valve check valve, the plunger movable within the central passageway of the service accelerated valve bushing and configured to displace the service accelerated valve diaphragm and service accelerated valve check valve, the service accelerated release valve having an open position and a closed position.

15. The service portion of claim 14, further comprising a grad valve having a first surface and a second surface, the first surface defining a generally rectangular-shaped opening, the second surface defining a generally circular-shaped opening.

16. The service portion of claim 15, further comprising a main bushing received within the piston passageway of the body of the service portion, the main bushing defining a central passageway.

17. The service portion of claim 16, further comprising a slide valve received by the central passageway of the main bushing, the slide valve including a body having a pair of extensions, the slide valve defining a plurality of passageways to form a porting pattern.

18. The service portion of claim 14, further comprising a back-flow check valve received within a back-flow check valve passageway defined by the body of the service portion.

19. The service portion of claim 18, wherein the back-flow check valve comprises a back-flow check valve bushing, a check valve member configured to engage the back-flow check valve bushing, and a back-flow check valve spring engaging the check valve member, the back-flow check valve having an open position and a closed position.

20. The service portion of claim 19, wherein the service accelerated release valve and the back-flow check valve are operatively connected to each other.

* * * * *